United States Patent [19]

Janson

[11] Patent Number: 4,466,592

[45] Date of Patent: Aug. 21, 1984

[54] SIGN HOLDER

[76] Inventor: Kenneth D. Janson, 33 W. Grand Ave., Old Orchard Beach, Me. 04064

[21] Appl. No.: 381,362

[22] Filed: May 24, 1982

[51] Int. Cl.³ .................................................. F16L 3/08

[52] U.S. Cl. .............................. 248/225.1; 248/220.2; 40/16.4; 40/324

[58] Field of Search ............... 248/225.1, 220.2, 222.2, 248/441 B, 308, 224.1, 221.4, 222.1; 40/324, 16.4, 15 R, 10 R, 16.6, 16; 211/86, 49

[56] References Cited

U.S. PATENT DOCUMENTS

| | | | |
|---|---|---|---|
| 3,094,305 | 6/1963 | Lohrman | 248/222.1 |
| 3,198,340 | 8/1965 | Tokash | 211/49 |
| 3,622,116 | 11/1971 | Fellows | 248/224.1 |
| 4,226,394 | 10/1980 | Einhorn | 248/225.1 |
| 4,356,646 | 11/1982 | Johnson | 40/16.4 |
| 4,362,285 | 12/1982 | Lewis | 248/221.4 |
| 4,373,693 | 2/1983 | Greenberger | 248/221.4 |
| 4,426,797 | 1/1984 | Burkemper et al. | 40/16.4 |

FOREIGN PATENT DOCUMENTS

| | | | |
|---|---|---|---|
| 0053086 | 5/1937 | Denmark | 248/308 |

*Primary Examiner*—William H. Schultz
*Assistant Examiner*—Ramon O. Ramirez
*Attorney, Agent, or Firm*—William Nitkin

[57] ABSTRACT

A sign holder especially adapted for use in food display cases such as meat cases wherein a portion of the sign holder is retained in the price tag retention molding of the case, and the sign-holding portion is adapted to move downward out of the way when loading the case and to spring back to its original position when the loading procedure has been completed.

8 Claims, 3 Drawing Figures

SIGN HOLDER

BACKGROUND OF THE INVENTION

1. Field of the Invention

The device of this invention resides in the area of sign holders and more particularly relates to an improved sign holder especially adapted for use in food display cases such as meat cases wherein the sign-carrying portion of the holder is movable out of the way of the person loading the case to allow for easy stocking of the case.

2. History of the Prior Art

At present meat-holding cases and the like utilize extruded price tag moldings for the insertion therein of price tags relating to the products placed in the case in front of the price tag moldings. These price tags may be of stiff board or plastic and are usually fitted into position so as to be held by their own tension caused by a bowing thereof between flange-like retainer elements of the price tag moldings. The price tag moldings may have a series of flange-like retention members for the holding of different size price tags. In some embodiments sign members are retained by these price tag molding flanges. These sign members extend upwards above the price tag molding itself and allow for more information or larger indicia to be utilized relating to the products in the case. When a case is being loaded, especially a meat case where heavy trays of product must be emptied from the rear of the case and placed into the case, it is often inconvenient for a worker to take the product and lift it over the sign to place it in the case. In some instances a worker will remove the sign, place the tray bottom on the rear upper edge of the case, and quickly empty the contents of the tray into the case. The removal of the sign, though, can be incovenient as there are many signs for the various commodities within the case, and time must be spent reattaching each sign in its proper position. Further some signs may be misplaced and erroneously interchanged with another or broken in the process.

SUMMARY OF THE INVENTION

It is an object of this invention to provide an improved sign holder to be used in a food case having a price tag molding at the rear which sign member does not have to be removed for loading the case and which is not in the way of the entry of food products into the case. The sign holder of this invention may be utilized in any type of case incorporating price tag moldings. Most typically such cases are used as meat cases in supermarkets, but the use of this invention is not limited only to meat cases.

It is a further object of this invention to provide such improved signs so that no alteration need be made to cases using price tag moldings and to provide a sign holder that will fit on a variety of cases and price tag moldings without alteration of the device.

The device is comprised of a sign holder element adapted to be of the general size of the sign to be inserted between two sign retention members on either side thereof. The sign may be slid into position from above and will slide down inside the sign retention members to a point where its further downward movement is stopped by a crimp in each sign retention member at the bottom thereof causing the sign retention member to contact the base of the sign holder. The base of the sign holder at its bottom includes a plurality of hinge members which receive a rod so that the base rotates on the rod. An upper retention member is positioned adjacent to the bottom of the base member. The upper retention member also has a plurality of hinge members which align between the hinge members of the base so that the upper retention member also rotates on the rod member. A low retention member is aligned with the upper retention member and also has a plurality of hinge members which are positioned adjacent to the hinge members of the base and upper retention member so that the rod member interconnects the lower retention member, upper retention member and base whereby they all pivot on the rod member. A spring member is positioned on the rod member causing the lower retention member to be held at a point somewhat below the upper retention member, but when the lower retention member is moved toward the upper retention member, tension is created on the spring member. The spring member also holds the sign member in an upright position urging it away from the lower retention member back toward the upper retention member. An angle stop adjustment member is positioned on the upper retention member and extends upward to a point to meet and stop the rearward movement of the base member. The angle stop adjustment member may be moved in different versions of the device by its angle adjustment positioning portion which is affixed either to the rear of the upper retention member or more toward its front. On the other end of the upper retention member from its hinge is the upper flange insert which is a portion thereof which extends upward and is adapted to be received by a flange of the price tag molding. The lower retention member extends to a lower retention extension member which terminates in a downwardly extending lower flange insert. The lower flange insert is adapted, when the lower retention member and upper retention member are compressed, to be received between the opening of an upper flange and lower flange of the price tag molding. The spring member, once insertion is complete, urges the upper flange insert upwards and the lower flange insert downwards so that they are held by the upper flange and lower flange of the price tag molding. One or more tightening members may be threadedly engaged through the upper retention member and upon rotation of the tightening member, it moves and strikes the lower retention extension so as to cause the upper retention member and the lower retention member not to be compressible and thereby upon further tightening, locks them into position in the price tag molding. The base member is at this point rotatable forward and downward on the rod and when released, it will spring back to its upright position until it strikes its angle stop adjustment. When one wishes to load the case, one places the tray against the rear of the sign base forcing it downward into the case. One can then easily slide the product-carrying tray down into the case and empty its contents. When one removes the tray, the sign springs back into its position where the sign is facing the customers.

DESCRIPTION OF THE PREFERRED EMBODIMENT(S)

Figure 1:
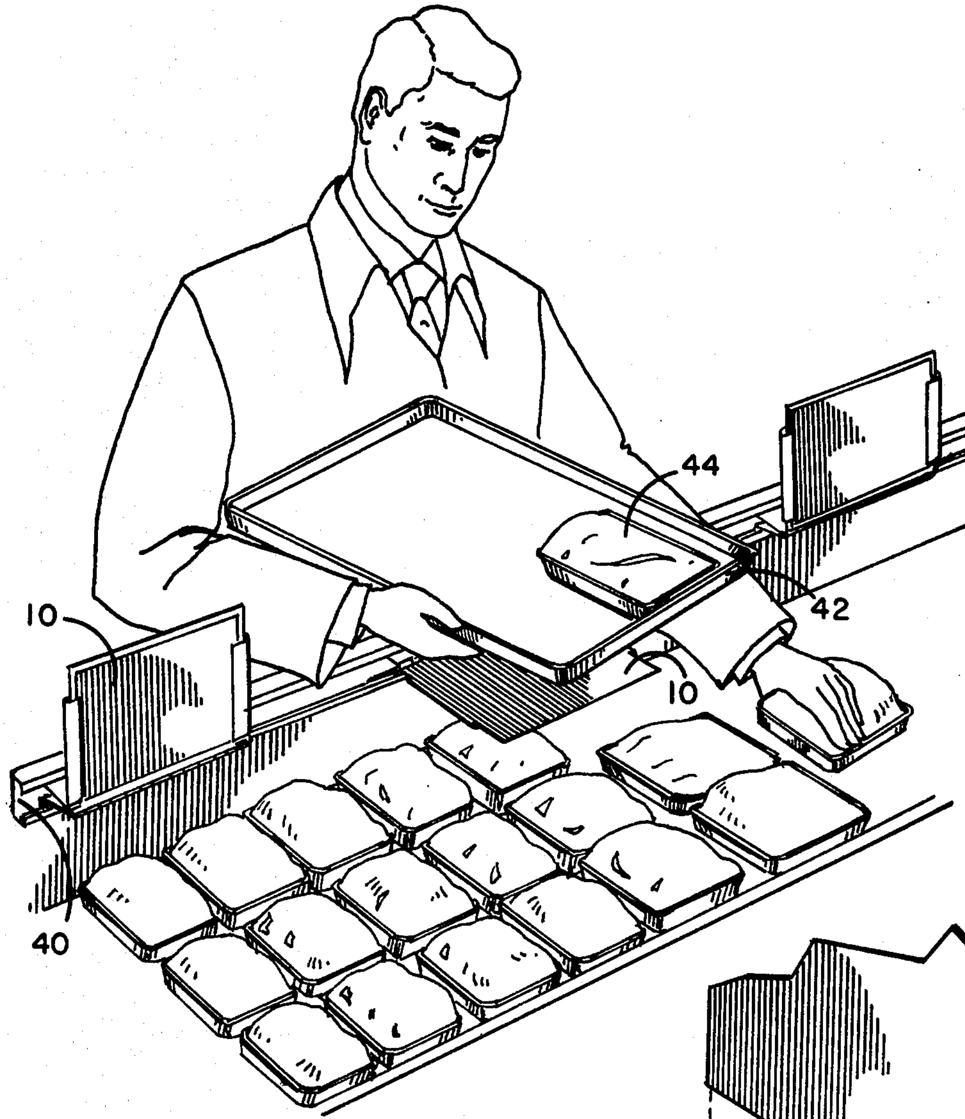
FIG. 1 illustrates a view of devices of this invention in use on a case with one sign holder in an upright position and the other lowered by a tray for entering product into the case.

FIG. 1 illustrates a view of the device of this invention in use in a case. Seen in this view is one sign holder 10 affixed within price tag molding 40. The adjacent sign holder, though, is in its downward case-loading mold having tray 42 placed thereover for easy loading of the product 44 into the case.

Figure 2:
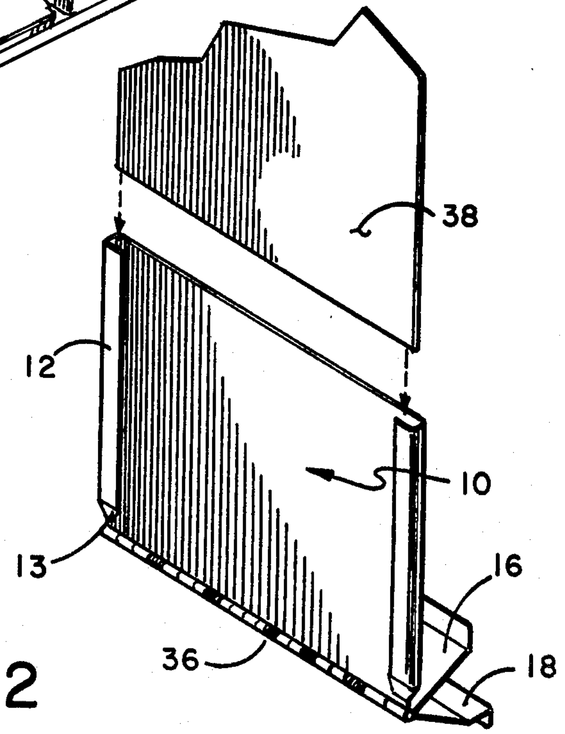
FIG. 2 illustrates a front view of the device of this invention with sign shown thereabove.
Figure 3:
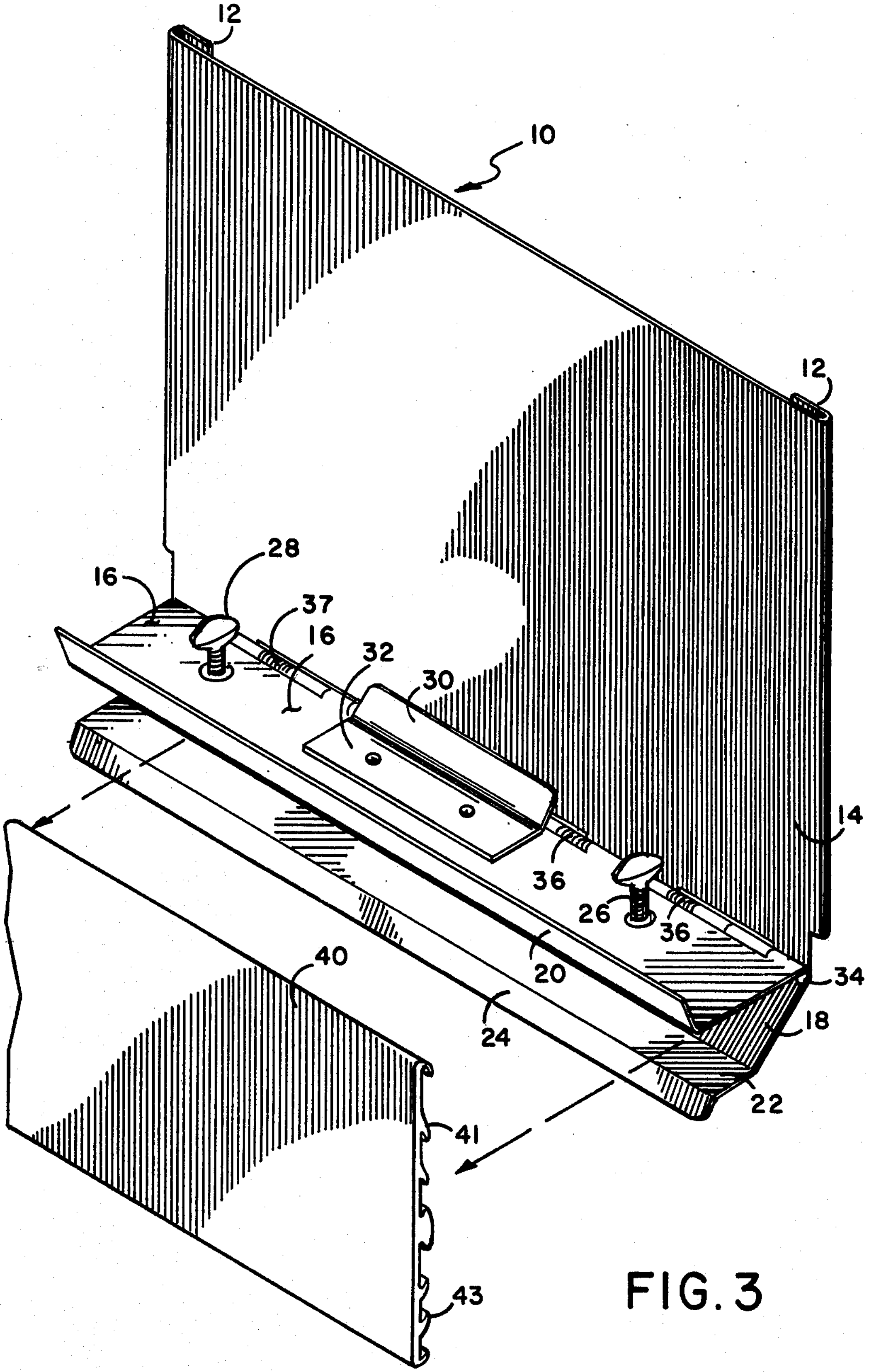
FIG. 3 illustrates a rear view of the device of this invention depicted in front of price tag molding.

FIG. 2 illustrates a front view of sign holder 10 with sign 38 positioned thereabove for sliding insertion between sign retention members 12 on each side of sign holding base 14. Crimp 13 at the bottom of each sign retention member causes it to contact base 14 preventing the sign from any further downward movement. In FIG. 3 sign holder 10 can be seen separated away from price tag molding 40 on which is visible upper flange 41 and lower flange 43. Base 14 is hingeably attached by means of rod member 34 to lower retention member 18 and upper retention member 16. Lower retention member 18 extends to lower retention extension member 22 which extension member helps position the lower retention member in a more forward position from the price tag molding so that the upper retention member 16 is relatively horizontal when installed. Upper flange insert 20 and lower flange insert 24 are adapted to be received into price tag molding 40 and to engage upper flange 41 and lower flange 43. Tightening members 26 and 28 and threaded through an aperture within upper retention member 16 and may have wing members at their tops so that when rotated, they move downwards and tighten against lower retention member 18 or lower retention extension member 22 to lock the sign holder in place tag molding 40. Angle stop adjustment 30 is positioned on the top of upper retention member 16 and held by the angle adjustment positioning member 32 thereof whose positioning determines determines the angle of sign base 14 to the upper retention member. Angle adjustment positioning member 32 may be either affixed to the upper retention member in a variety of permanent positions or it could be adjustable, for example, by having a slot therein with wing-topped screw adjustment means passing therethrough to tighten it in a desired position on the upper retention member with the wing-topped screw being threadedly engaged therein and adapted to travel in a slot in the upper retention member. Different cases may require different angle stop adjustment member positions and may also require different angles of the upper and lower flange inserts 20 and 24 and modifications of the angle of the lower retention extension member to the lower retention member. The upper and lower retention members may be also of modified configuration to adapt to different price tag moldings and there retention members do not have to extend to the edge of sign base 14 as shown but can be narrower in some embodiments.

A first spring member 36 can be of the coil type around rod 34, having its first end on the front of sign base 14 and its second end on the front of lower retention member 18, urging both rearwards toward the upper retention member but yet allowing the sign base to be moved forward in use and after use, to spring back to a viewing position, having enough tension to cause sign holder 14 to strike the angle stop adjustment 30. A second spring member 37, also coiled around rod 34, has its first end on the inside of lower retention member 18 and its second end on the inside bottom of upper retention member 16, urging those two members apart from one another yet being compressible together with the limits of their movement apart determined when angle stop adjustment 30 strikes the rear of sign base 14 and when the first end of the spring on lower retention member 18 either ends its travel and is no longer under tension or is balanced and its movement stopped by the opposing tension of the first spring member. There may be more than one spring member utilized and in a preferred embodiment, there are three first spring members and two second spring members, each of equal size.

Although the present invention has been described with reference to particular embodiments, it will be apparent to those skilled in the art that variations and modifications can be substituted therefor without departing from the principles and spirit of the invention.

I claim:

1. A sign holder for positioning in the price tag molding of a case, comprising:

a sign base member;

means to hold a sign to said sign base member;

an upper retention member having a first side and a second side;

a lower retention member having a first side and a second side;

means to hold the first side of said upper retention member, the first side of said lower retention member and bottom of said base member in rotatable relation to one another;

means to hold the second side of said upper retention member and the second side of said lower retention member to said price tag molding; and means for urging said sign base member to an upright position when said device is installed while allowing said sign base member to be rotated downward at various desired times.

2. The device of claim 1 further including tightening means to lock said upper retention member and lower retention member in a fixed position for retention within said price tag molding.

3. The device of claim 1 wherein said means for holding said upper retention member, lower retention member and sign base member together comprise:

hinge means formed on each member, adapted to be adjacent to one another;

a rod member positioned within said hinge means adapted for rotation of each member;

spring means positioned on said rod member and contacting said hinge members to urge said upper flange member and lower flange member away from one another a predetermined distance apart, said spring means further urging said sign base member away from said lower retention member toward said upper retention member.

4. The device of claim 3 further including an angle stop adjustment member positioned on said upper retention member adapted to prevent further rearward movement by said sign base member toward said upper retention member and adapted to hold said sign base member in an upright position for viewing.

5. The device of claim 2 wherein said tightening means include at least one tightening member threadedly engaged through said upper retention member adapted to be rotated and lowered, tightening against said lower retention member when said upper and lower retention members are held in a price tag molding.

6. The device of claim 5 wherein:

said price tag molding includes a lower flange and an upper flange for the retention of price tags therein;

an upper flange insert positioned on the second side of said upper flange member;

a lower flange insert positioned on the second side of said lower retention member; and said upper and lower flange inserts adapted to be positioned so as to engage the upper flange and lower flange of said price tag molding.

7. The device of claim 1 wherein said lower retention member includes a lower retention extension member between it and said lower flange insert, said lower retention extension member adapted to position the lower retention member away from the price tag molding so as to cause the upper retention member to be in a more horizontal mode.

8. The device of claim 1 wherein said means to retain said sign to said sign holder include a first and second sign retention member, each disposed on a side of said sign base member forming channels at each end thereof in which said sign can be slideably inserted and held.

* * * * *